United States Patent [19]

Wion et al.

[11] 4,033,456

[45] July 5, 1977

[54] TERMINAL STRIP HAVING PLASTIC CARRIER STRIP

[75] Inventors: Donald Andrew Wion, Harrisburg; Christopher Kingsley Brown, Camp Hill, both of Pa.

[73] Assignee: AMP Incorporated, Harrisburg, Pa.

[22] Filed: May 25, 1976

[21] Appl. No.: 689,883

[52] U.S. Cl. ............................... 206/347; 206/330; 206/820

[51] Int. Cl.² ................ B65D 73/02; B65D 85/42; B65D 85/24

[58] Field of Search ............... 206/820, 343–347, 206/329, 330

[56] References Cited

UNITED STATES PATENTS

| 377,804 | 2/1888 | Grant | 206/344 |
|---|---|---|---|
| 1,378,550 | 5/1921 | Miller | 206/344 |
| 3,048,268 | 8/1962 | Rocchi et al. | 206/330 |
| 3,212,632 | 10/1965 | Baum et al. | 206/347 |
| 3,545,606 | 12/1970 | Bennett | 206/820 |
| 3,977,522 | 8/1976 | Van Der Aker et al. | 206/820 |

FOREIGN PATENTS OR APPLICATIONS

| 1,162,639 | 8/1969 | United Kingdom | 206/344 |

*Primary Examiner*—William Price
*Assistant Examiner*—Douglas B. Farrow
*Attorney, Agent, or Firm*—Frederick W. Raring; Robert W. Pitts; Jay L. Seitchik

[57] ABSTRACT

A continuous strip of terminal posts comprises a plastic carrier strip through which the posts are inserted at regular spaced apart intervals. The carrier strip is of a thermoplastic material and has a generally H-shaped cross-section. The posts extend between the sidewalls of the carrier strip and through the web portion thereof. The individual posts are removed from the carrier strip at the time of insertion into a printed circuit board by an insertion punch which has a chisel-like end such that it splits the carrier strip during insertion.

4 Claims, 5 Drawing Figures

U.S. Patent
July 5, 1977
4,033,456
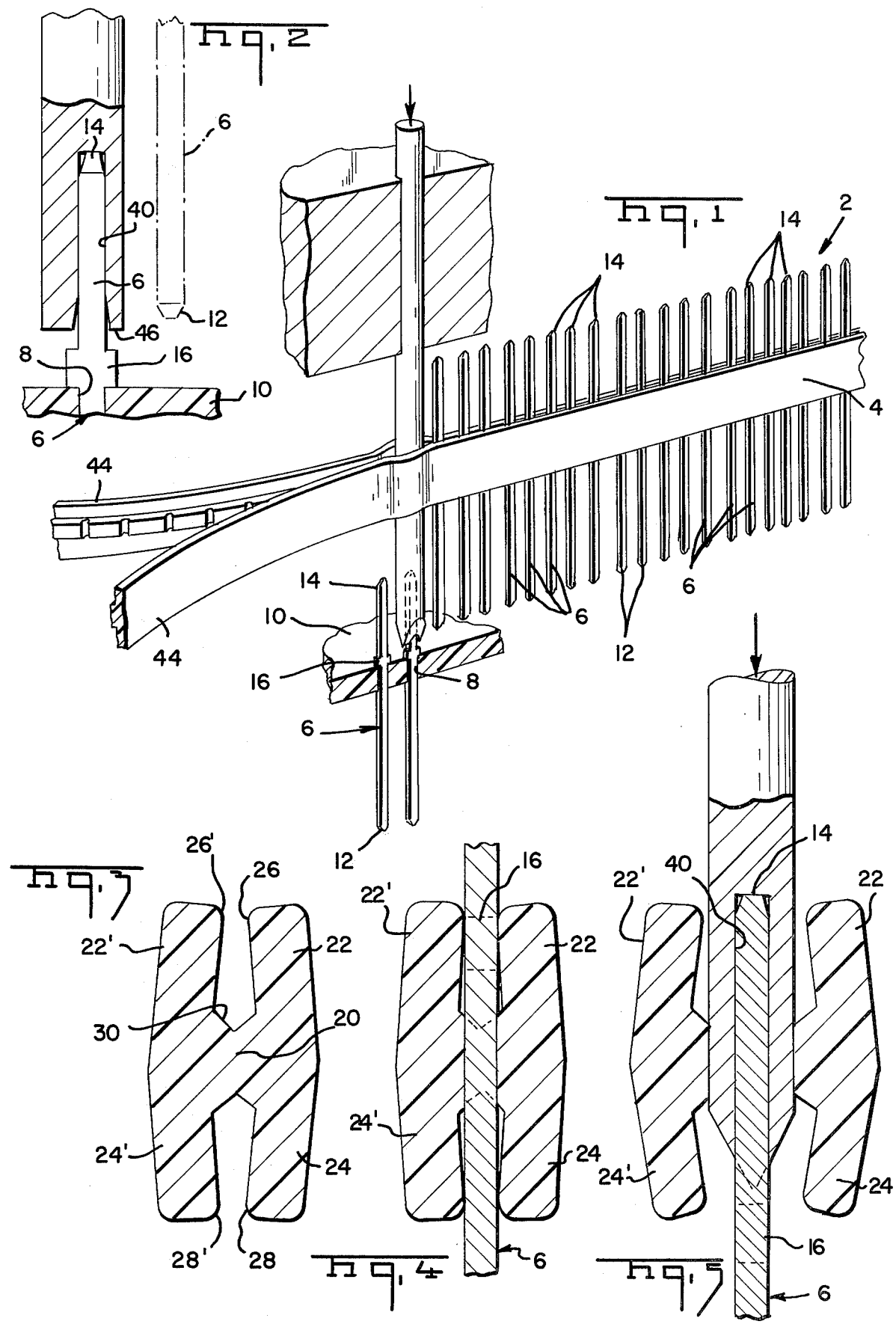

TERMINAL STRIP HAVING PLASTIC CARRIER STRIP

BACKGROUND OF THE INVENTION

This invention relates to terminals in strip form, particularly, a continuous strip of terminal posts or pins in side-by-side spaced apart relationship. Terminal posts or terminal pins are commonly provided by the manufacturer to the user as continuous strips of this type and the use, who might be a manufacturer of electronic equipment, separates the posts from the strip when they are inserted into a printed circuit board or the like.

Terminal posts of the type commonly used in the electronics industry may be manufactured by either stamping the posts from a continuous strip of sheet metal or the posts may be manufactured from a continuous reel of suitable wire which usually has a square cross-section. Wire type posts are manufactured by simply feeding the wire axially through a machine which severs the wire into the proper length pieces for the posts and, forms a conical or tapered surface on the ends of the individual posts. The posts are usually swaged intermediate their ends to provide an enlarged section by means of which they are retained in a printed circuit board.

When posts are manufactured by stamping, they are in the form of a continuous strip as they emerge from the stamping die and the individual posts are sheared from the strip by an insertion machine when they are inserted into a printed circuit board. Stamped terminal posts are widely used but they are relatively more expensive than posts formed from wire because of the scrap loss in manufacturing and wire posts are therefore preferred under many circumstances because of their cost advantage. Wire posts are manufactured as loose piece articles and it is desirable to mount them on a suitable carrier strip so that they can be supplied to the user in the form of a continuous strip, see U.S. Pat. Nos. 3,664,015, 3,545,606, 3,601,090, and 3,841,472. These patents show several different forms of carrier strips for loose piece terminal posts which have been proposed in the past.

The instant invention is directed to the achievement terminal an improved carrier strip for loose piece termianl posts and to an improved continuous strip of terminal posts. More specifically, the invention is directed to the achievement of a carrier strip which can be used for posts of different thicknesses and lengths. The invention is also directed to a continuous strip of terminal posts which can be produced with the terminal posts spaced apart by any desired amount. The invention is further directed to the achievement of a terminal post strip from which the individual terminal posts can be easily removed at the time of insertion into a printed circuit board.

In accordance with a preferred embodiment of my invention, the terminal posts are mounted on a generally H-shaped carrier strip of extruded terminal plastic material, the posts being in side-by-side spaced apart relationship and extending through the web portion of the carrier strip and between the sidewalls thereof. The arrangement is such that the individual posts are held securely by the web of the carrier strip and they are restrained against movement transversely of their axes by the sidewalls of the carrier strip so that the strip remains flat and even during handling and passage through an insertion machine. The individual posts are easily removed at the time of insertion by a punch which engages the leading post of the strip, and inserts it into a printed circuit board. The punch, simultaneously slits the carrier strip.

It is accordingly an object of the invention to provide an improved strip of electrical terminal posts. It is a further object to provide an improved strip for terminal posts which are manufactured in loose piece form. A further object is to provide a low-cost terminal strip which will effectively retain the terminal posts therein and from which the terminal posts can be easily removed at the time of insertion into the printed circuit board.

These and other objects of the invention are achieved in a preferred embodiment thereof which is briefly described in the foregoing abstract, which is described in detail below and which is shown in the accompanying drawing in which:

FIG. 1 is a perspective view of a strip of terminal posts in accordance with the invention; this view also illustrates the manner of pushing the leading post from the strip and inserting it into a printed circuit board.

FIG. 2 is a fragmentary view illustrating the insertion of a post into a printed circuit board and showing the lower end of the insertion punch.

FIG. 3 is a cross-sectional view of the plastic carrier strip prior to insertion of the terminal posts into the web of the carrier strip.

FIG. 4 is a view similar to FIG. 3 but showing a terminal post extending through the web.

FIG. 5 is a cross-sectional view showing the manner in which the insertion punch splits the carrier strip at the time of insertion.

A strip 2 of terminal posts in accordance with the invention comprises a continuous plastic carrier strip 4 having the terminal posts 6 thereon in side-by-side spaced apart relationship. Strips of terminal posts of this general class are used by manufacturers of electrical equipment, the individual posts being inserted into holes 8 in the printed circuit board 10 by a suitable insertion apparatus.

The individual posts 6 are manufactured from wire having a square cross-section by means of a machine which cuts the wire to the appropriate length, rounds or otherwise forms the ends 12, 14 of each section and swages each section of wire intermediate its ends as shown at 16 to provide an interference fit in the hole 10. The plastic carrier strip 4 is in the form of a continuous extrusion of a material such as polypropylene or polyethylene and has a generally H-shaped cross-section as shown in FIG. 2. The strip thus has a central web 20 from which sidewalls 22, 22' and 24' extend in opposite directions. The sidewalls are inclined inwardly towards each other so that the adjacent inner edges 26, 26' and 28, 28' of the sidewalls are relatively close to each other.

The individual posts are assembled to the carrier strip 4 by feeding the strip through an assembly machine and driving the posts along a path extending between the sidewalls and through the web 20. The relatively soft web is pierced by the posts and they are retained on the strip by virtue of this fact. Additionally, portions of each post which are on each side of the web 20 are restrained against lateral movement by the adjacent inner edges 26, 26', 28, 28'.

If the posts have a thickness which is greater than the spacing between these edges, the individual posts will be grasped by the sidewalls and if the posts are relatively thin, the individual post will be restrained against movement laterally from the strip. In both instances, the individual terminal posts are held in co-planar relationship and the strip can be fed through a post insertion machine, and otherwise handled with ease and without any tendency to jam the machine through which it is being fed.

The posts 6 are inserted into the holes 8 of the printed circuit board 10 by a suitable apparatus of the type commonly known to the electrical industry. As shown in FIG. 3, the apparatus is equipped with an insertion punch 32 having a cylindrical shank 36 which is provided with inclined convergent surfaces 38 on opposite sides thereof at its lower end to define a chisel-like end on the punch. A pin-receiving hole 40 extends into the lower end, this hole being slightly off-center along the line defined by the intersection of the surfaces 38 for reasons which will be explained below. The apparatus has suitable guide means indicated at 42 for the punch and is additionally provided with means (not specifically shown) for feeding the strip to the insertion station. It should be noted that the punch is oriented such that the side 46 which is adjacent to the hole 40 is proximate to the second post in the strip, that is the post which is next adjacent to the post being inserted. As shown in FIG. 2, the off-center location of hole 40 ensures that the punch will not be against the next adjacent post in the strip at the time of insertion.

At the time of insertion, the punch is simply moved downwardly so that the upper end of the post enters the hole 40 in the punch. Upon further downward movement of the punch, the post is pushed through the strip and inserted into the hole 10 in the printed circuit board. The chisel-like lower end of the insertion punch splits the web of the plastic strip in the vicinity of the post which is being inserted so that the scrap carrier strip comprises two separate strips 44.

Terminal strip in accordance with the invention can be produced at an extremely low cost since the carrier strip comprises a continuous extrusion of inexpensive plastic material as noted above. Moreover, one size of carrier strip can be used with many different sizes of terminals both as regards thickness and diameter and length and it is therefore unnecessary to provide an especially designed or dimensioned strip for every size post. The spacing between adjacent posts can be varied or set at any desired pitch since the carrier strip is uniform along its entire length.

An added avantage of a terminal strip in accordance with the invention is that it is entirely practical to design an insertion apparatus having multiple insertion punches rather than a single insertion punch as shown in the drawing. A multiple insertion punch would have a plurality of openings therein for the reception of the upper ends of a plurality of terminals and would have an edge on its lower end for slitting an elongated section of the carrier strip. The practicality of removing a plurality of posts from the plastic carrier strip and simultaneously inserting them into a like plurality of holes is a result of the fact that the insertion operation does not require a metal shearing operation, as is required with integrally connected strip posts, and the insertion tool can be designed to slit a substntial length of the carrier strip.

What is claimed is:
1. A continuous strip of terminal posts, said posts being intended for insertion into a printed circuit board by an insertion apparatus of the type having an insertion punch which engages one end of each pin and pushes it axially into the printed circuit board, said strip comprising:
   a continuous carrier strip of thermoplastic material, said strip having a web portion and a pair of continuous post holding flanges extending from the edges of said web portion on both sides of said web portion,
   a plurality of terminal posts extending through and held in said web, the axes of said posts extending substantially normally of said web,
   portions of said posts which are between said flanges on both sides of said web portion being confined against lateral movement by said flanges whereby said posts are stabilized in a common plane, said posts being individually removable from said strip during insertion into a printed circuit board by axially aligning the leading post of said strip with an insertion punch and thereafter moving said punch towards said leading post whereby said punch will push said leading post from said strip and into said printed circuit board located beneath said strip.
2. A continuous strip of terminal posts as set forth in claim 1, said holding flanges extending convergently from said web portion, said holding flanges having free edge portions which are disposed against said posts.
3. A continuous strip of terminal posts, said posts being intended for insertion into a printed circuit board by an insertion apparatus of the type having an insertion punch which engages one end of each post and pushes it axially into the printed circuit board, said strip comprising:
   a continuous carrier strip of extruded thermoplastic material, said strip having a generally H-shaped cross-section comprising a web and sidewalls extending in opposite directions from both side edges of said web,
   a plurality of terminal posts extending through said web at regularly spaced intervals, said posts having been pushed through said web and held by the material in said web,
   portions of said posts on each side of said web being frictionally confined by said sidewalls whereby each of said posts is restrained against lateral movement by said strip at three locations,
   said posts being individually removable from said strip during insertion into a printed circuit board by axially aligning the leading post of said strip with an insertion punch having a chisel edge leading end and a post receiving bore extending into said leading end, and thereafter moving said punch towards said leading post whereby one end of said leading post will enter said bore, said punch will push said post from said strip and into a printed circuit board located beneath said strip, and said chisel end will split said strip during movement therethrough.
4. A continuous strip of terminal posts as set forth in claim 3, said sidewalls on each side of said web being convergently inclined and being against said posts.

* * * * *